United States Patent
Yan

(10) Patent No.: US 11,584,235 B2
(45) Date of Patent: Feb. 21, 2023

(54) ACCELERATOR CONTROL METHOD AND DEVICE, POWER SYSTEM AND UNMANNED AERIAL VEHICLE

(71) Applicant: Autel Robotics Co., Ltd., Guangdong (CN)

(72) Inventor: Shizhi Yan, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 460 days.

(21) Appl. No.: 16/727,272

(22) Filed: Dec. 26, 2019

(65) Prior Publication Data

US 2020/0139823 A1 May 7, 2020

Related U.S. Application Data

(63) Continuation of application No. PCT/CN2017/096662, filed on Aug. 9, 2017.

(30) Foreign Application Priority Data

Jun. 26, 2017 (CN) .......................... 201710497398.8

(51) Int. Cl.
 *B60L 15/20* (2006.01)
 *B64C 39/02* (2006.01)

(52) U.S. Cl.
 CPC ............ *B60L 15/20* (2013.01); *B64C 39/024* (2013.01); *B60L 2200/10* (2013.01);
 (Continued)

(58) Field of Classification Search
 CPC .... B60L 15/20; B60L 2200/10; B64C 39/024; B64C 2201/027; B64C 2201/042;
 (Continued)

(56) References Cited

U.S. PATENT DOCUMENTS

2005/0274560 A1* 12/2005 Wakao ................ B60L 15/2045
 180/197
2007/0228304 A1* 10/2007 Nishiuchi ................ G21K 1/10
 250/493.1
(Continued)

FOREIGN PATENT DOCUMENTS

CN 202345910 U 7/2012
CN 104407586 A 3/2015
(Continued)

OTHER PUBLICATIONS

International Search Report dated Mar. 23, 2018; PCT/CN2017/096662.
(Continued)

*Primary Examiner* — Gertrude Arthur JeanGlaude

(57) ABSTRACT

The present application relates to an accelerator control method and device, a power system and an unmanned aerial vehicle (UAV). The method includes: receiving, by an electronic speed control (ESC), an accelerator signal through a serial communication interface; extracting accelerator control data from the accelerator signal; generating, according to the accelerator control data, a motor control signal for controlling operation of a motor; and transmitting the motor control signal to the motor. The accelerator signal received through the serial communication interface is a digital signal subjected to small interference during transmission, unlike an analog signal that is susceptible to interference such as impedance and capacitive reactance, which causes data inaccuracy. In addition, in the manner of serial communication, a higher baud rate may be adopted to shorten an accelerator control cycle, thereby achieving high-speed control of an accelerator and increasing the control frequency.

16 Claims, 2 Drawing Sheets

(52) U.S. Cl.
CPC .. *B64C 2201/027* (2013.01); *B64C 2201/042* (2013.01); *B64C 2201/108* (2013.01); *B64C 2201/146* (2013.01); *B64C 2201/162* (2013.01)

(58) Field of Classification Search
CPC ........ B64C 2201/108; B64C 2201/146; B64C 2201/162
USPC .......................................................... 701/3
See application file for complete search history.

(56) References Cited

U.S. PATENT DOCUMENTS

| | | | |
|---|---|---|---|
| 2011/0301787 A1 | 12/2011 | Chaperon et al. | |
| 2013/0173108 A1* | 7/2013 | Hashimoto | B60K 6/445 903/903 |
| 2017/0043862 A1 | 2/2017 | Lippincott | |
| 2017/0084181 A1 | 3/2017 | Wilson et al. | |

FOREIGN PATENT DOCUMENTS

| | | | |
|---|---|---|---|
| CN | 105353762 | A | 2/2016 |
| CN | 205293077 | U | 6/2016 |
| CN | 205469847 | U | 8/2016 |
| CN | 205525004 | U | 8/2016 |
| CN | 206023654 | U | 3/2017 |
| CN | 106687936 | A | 5/2017 |
| CN | 106716277 | A | 5/2017 |
| EP | 3080673 | A1 | 10/2016 |
| WO | WO2016078056 | * | 5/2016 |

OTHER PUBLICATIONS

From Wikipedia; RS-485 ; 11 pages; Approved Mar. 3, 1998.
Supplementary European Search Report completed Apr. 29, 2020; EP17915469.

* cited by examiner

ACCELERATOR CONTROL METHOD AND DEVICE, POWER SYSTEM AND UNMANNED AERIAL VEHICLE

This application is a continuation of International Patent Application No. PCT/CN2017/096662 filed on Aug. 9, 2017, which claims priority to Chinese Patent Application No. 201710497398.8 filed on Jun. 26, 2017, both of which are incorporated by reference herein in their entireties.

BACKGROUND

Technical Field

The present application relates to the field of accelerator control, and in particular, to an accelerator control method and device, a power system and an unmanned aerial vehicle (UAV).

Related Art

With the development of technology and the continuous improvement of people's requirements for product performance, upper-level control of increasingly more products is forced to require higher control frequencies, shorter control cycles and even precise control.

When a user operates a remote control, an operation signal is sent to a flight control module. Then the flight control module obtains an accelerator signal of each electronic speed control (ESC) through calculation in combination with an attitude of an aircraft according to the operation signal of the user, the accelerator signal is modulated to a pulse of a corresponding width and sent to the ESC, and the ESC captures an input pulse width through a timer and obtains an accelerator value through calculation.

The ESC is an electronic speed control, as an execution component, which needs to receive an external control signal, make a response and perform an operation. The control signal may be implemented in a plurality of manners including a voltage signal ADC, the pulse width, etc.

The pulse width manner has advantages of simple control and strong universality, which is a universal accelerator control method for almost all ESC products on the market. The accelerator signal controlled by adopting the pulse width uses the pulse width to represent an accelerator opening degree. An accelerator controller modulates the accelerator signal to a corresponding pulse width output according to a magnitude of an accelerator value. The ESC uses an input capture function of the timer to measure the pulse width, and then converts the pulse width to obtain the accelerator value. At present, communication signals between all ESCs and accelerator controllers on the market are pulse width modulation (PWM) signals. The existing method for controlling the accelerator of the ESC on a device such as an unmanned aerial vehicle (UAV) has disadvantages of a long control cycle, poor accuracy and a failure to meet higher requirements for control accuracy.

SUMMARY

Based on this, it is necessary to provide an accelerator control method and device, a power system and an unmanned aerial vehicle (UAV) with a short control cycle and high accuracy.

In order to resolve the foregoing technical problem, embodiments of the present application provide the following technical solutions.

An accelerator control method, including:
receiving, by an electronic speed control (ESC), an accelerator signal through a serial communication interface;
extracting accelerator control data from the accelerator signal;
generating, according to the accelerator control data, a motor control signal for controlling operation of a motor; and
transmitting the motor control signal to the motor.

In order to resolve the foregoing technical problem, the embodiments of the present application further provide the following technical solutions.

An accelerator control device including an electronic speed control (ESC), the ESC including:
a serial communication interface configured to receive an accelerator signal;
an extracting unit configured to extract accelerator control data from the accelerator signal;
a control unit configured to generate, according to the accelerator control data, a motor control signal for controlling operation of a motor; and
a motor control signal interface configured to transmit the motor control signal to the motor.

In order to resolve the foregoing technical problem, the embodiments of the present application further provide the following technical solutions.

A power system, including:
a motor; and
the accelerator control device as described above, the accelerator control device being electrically connected to the motor and being configured to control the motor.

In order to resolve the foregoing technical problem, embodiments of the present application further provide an unmanned aerial vehicle (UAV), the UAV including:
a fuselage;
the power system as described above, which is mounted to the fuselage and configured to provide flight power for the UAV.

In order to resolve the foregoing technical problem, the embodiments of the present application further provide the following technical solutions.

An unmanned aerial vehicle, including:
a center housing;
an arm connected to the center housing;
an accelerator controller located in a cavity formed by the arm or the center housing;
an electronic speed control (ESC) connected to the accelerator controller through a serial communication interface;
a motor connected to the arm; and
a propeller connected to the motor and configured to generate, under the driving of the motor, a force that causes the UAV to move; where the ESC is configured to:
receive an accelerator signal from the accelerator controller through the serial communication interface;
extract accelerator control data from the accelerator signal;
generate, according to the accelerator control data, a motor control signal for controlling the operation of the motor; and
transmit the motor control signal to the motor to control a speed at which the motor rotates.

The ESC receives the accelerator signal through the serial communication interface, and the accelerator signal received through the serial communication interface is a digital signal subjected to small interference during transmission, unlike an analog signal that is susceptible to interference such as impedance and capacitive reactance. Therefore, data inaccuracy may not be caused. In addition, in the manner of serial communication, a higher baud rate may be adopted to shorten an accelerator control cycle, thereby achieving high-speed control of an accelerator and increasing the control frequency. The ESC extracts the accelerator control data of the digital signal from the accelerator signal, and extracts the accelerator control data from the accelerator signal of the digital signal. This manner is simple and convenient, and the data is accurate. Finally, the motor control signal for controlling operation of the motor is generated according to the accelerator control data, and the motor control signal is transmitted to the motor, so that front-end accelerator control data may be transmitted to the motor without deviation.

BRIEF DESCRIPTION OF THE DRAWINGS

To describe the technical solutions in the embodiments of this application or in the prior art more clearly, the following briefly introduces the accompanying drawings for describing the embodiments or the prior art. Apparently, the accompanying drawings in the following description show merely some embodiments of this application, and a person of ordinary skill in the art may still derive drawings of other embodiments from the accompanying drawings without creative efforts.

DETAILED DESCRIPTION

Figure 1:
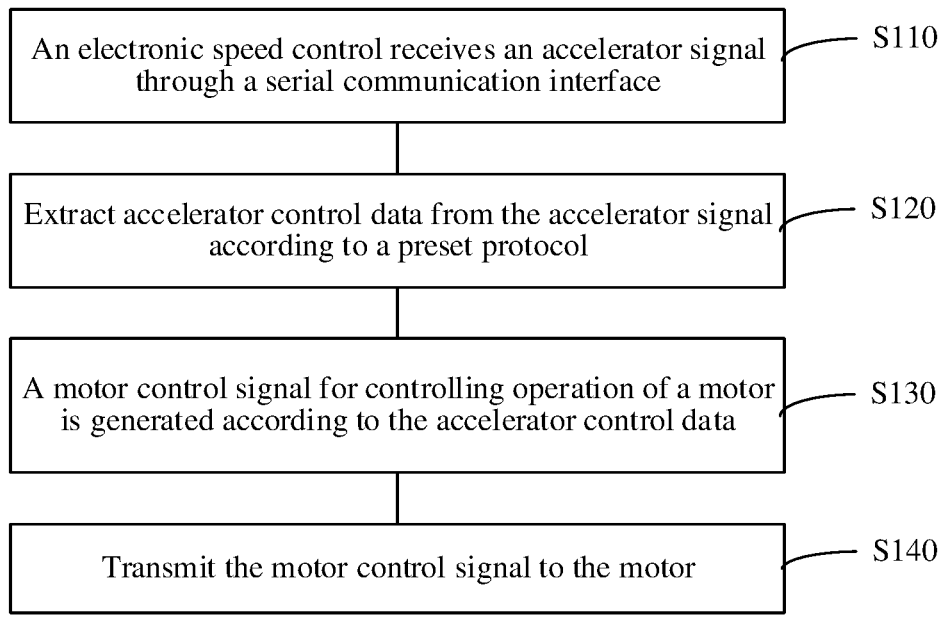
FIG. 1 is a flowchart of an accelerator control method of an electronic speed control according to an embodiment of the present application.

For ease of understanding this application, this application is described more fully below with reference to the related accompanying drawings. The accompanying drawings show preferred embodiments of this application. However, this application can be implemented in various different forms, and is not limited to the embodiments described in this specification. Conversely, the embodiments are described for the purpose of providing a more thorough and comprehensive understanding of the content disclosed in this application.

It should be noted that an element described as being "fixed" to another element may be directly on the other element, or an intervening components may be present. When an element is considered as being "connected" to another element, the element may be directly connected to the another element or indirectly connected to the another element. The terms "vertical", "horizontal", "left", "right" and similar expressions used herein are only used for the purpose of description from a certain point of view, and should not be construed as a limitation on the protection scope of this application.

Unless otherwise defined, meanings of all technical and scientific terms used in this specification are the same as that usually understood by a person skilled in the technical field to which this application belongs. In this specification, terms used in the specification of this application are merely intended to describe objectives of the specific embodiments, but are not intended to limit this application. A term "and/or" used in this specification includes any or all combinations of one or more related listed items.

Embodiments of the present application may be applied to various motor-driven movable objects, including but not limited to an unmanned aerial vehicle (UAV), a ship and a robot. The UAV is now used as an example for description. A structure of the UAV includes a center housing, an arm, an accelerator controller and a power system. The arm is integrally or fixedly connected to the center housing, the power system is mounted onto the arm, and the accelerator controller is located in a cavity formed by the arm or the center housing. Preferably, the accelerator controller is located in a cavity formed by the center housing. A typical power system includes an electronic speed control (ESC), a motor and a propeller. The ESC is located in a cavity formed by the arm or the center housing. One end of the ESC is electrically connected to the accelerator controller, and another end of the ESC is electrically connected to the motor. The motor is installed on the arm, and a rotation shaft of the motor is connected to the propeller. The propeller generates, under the driving of the motor, a force that causes the UAV to move, for example, lift or thrust that causes the UAV to move.

In an embodiment of the present application, the ESC is connected to the accelerator controller through a serial communication interface. A baud rate of the serial communication interface may be set according to a scenario in which the UAV is located or a specific function that is performed. In an implementation, a baud rate of the serial communication interface is greater than or equal to 115200 bps. The ESC receives an accelerator signal from the accelerator controller through the serial communication interface, extracts accelerator control data from the accelerator signal, generates a motor control signal for controlling operation of the motor, and sends the motor control signal to the motor to control a speed at which the motor rotates.

The accelerator signal in the embodiment of the present application is a digital signal with strong anti-interference performance. The present application does not limit a specific format of the accelerator signal, as long as both the ESC and the accelerator controller can understand the signal.

The present application does not limit a type of the serial communication interface, which may be any of a CAN interface, an SPI interface, a UART interface, an I2C interface, an RS232 interface and a USB interface.

In an implementation, the accelerator controller may be a flight control module of the UAV. The flight control module perceives the environment around the UAV through various sensors and controls the flight of the UAV. The flight control module may be a processing unit, an application specific integrated circuit (ASIC) or a field programmable gate array (FPGA). It should be noted that when the power system is in a test state, the accelerator controller may be an accelerator generator or a motion control module. The accelerator generator or the motion control module may be an application specific integrated circuit or a field programmable gate array or a processing unit, which is mainly configured to simulate the accelerator signal and send the generated accelerator signal to the ESC.

The UAV may be provided with one or more ESCs. When there is only one ESC, the ESC may control all the motors on the UAV. When there is a plurality of ESCs, the quantity of ESCs may be equal to the quantity of motors, each of the ESCs controls only one motor, and each motor is controlled by only one ESC. When there is a plurality of ESCs, each of the ESCs may receive, through the serial communication interface, the accelerator signal sent by the accelerator controller. In this case, the accelerator controller may send the accelerator signal in a broadcast manner. The accelerator signal generated by the accelerator controller includes accelerator control data corresponding to the plurality of ESCs, each of the ESCs extracting accelerator control data corresponding to each of the ESCs from the accelerator signal according to an identifier of each of the ESCs.

In an implementation, in order to enhance the security of the data, the accelerator signal generated by the accelerator controller includes check data. After receiving the accelerator signal sent by the accelerator controller, the ESC checks the accelerator signal according to the check data in the accelerator signal. If the checking succeeds, the accelerator control data is extracted from the accelerator signal.

The ESC in the prior art adopts an accelerator signal in a pulse width control manner. A transmission cycle of a pulse is generally 2.5 ms or longer, and a control frequency is less than 500 Hz. In this way, if a smaller control cycle is to be achieved, an only way is to reduce the pulse width and cycle. However, this will bring another problem, that is, deterioration in the accelerator. The reason is that the accelerator value is obtained through measuring the width of the pulse. In essence, the accuracy of the accelerator is difficult to guarantee. Interference of lines and the accuracy of the measurement both affect the accuracy of the accelerator, resulting in an error between the accelerator value obtained by the ESC and the actually given accelerator value. The error increases with the decrease in an effective width range of the pulse. The embodiments of the present application provide the method for receiving the accelerator signal through the serial communication interface and the corresponding device. Since the accelerator signal received through the serial communication interface is a digital signal subjected to small interference during transmission, unlike an analog signal that is susceptible to interference such as impedance and capacitive reactance and further causing data inaccuracy. In addition, in the manner of serial communication, a higher baud rate may be adopted to shorten an accelerator control cycle, thereby achieving high-speed control of an accelerator and increasing the control frequency. The ESC extracts the accelerator control data of the digital signal format from the accelerator signal, and extracts the accelerator control data from the accelerator signal of the digital signal format. This manner is simple and convenient, and the data is accurate. Finally, the motor control signal for controlling operation of the motor is generated according to the accelerator control data, and the motor control signal is transmitted to the motor, so that the accelerator control data may be transmitted to the motor without deviation to control rotation of the motor.

With reference to the foregoing description, an embodiment of the present application provides an accelerator control method, as shown in FIG. 1. As an example rather than a limitation, the method shown in FIG. 1 is performed by an electronic speed control ("ESC") and includes the following steps.

S110: An ESC receives an accelerator signal through a serial communication interface.

The ESC is connected to an accelerator controller through the serial communication interface. The ESC receives an accelerator signal of a digital signal format from the accelerator controller through the serial communication interface. The accelerator controller may be a control module, such as an accelerator generator, a flight control module and a motion control module, that controls the accelerator signal.

S120: Accelerator control data is extracted from the accelerator signal.

The accelerator signal may include information such as a frame header, a command type, a frame length or a data length, accelerator data of the ESC and a check code. Optionally, in some other implementations, the accelerator signal may further include information such as a light control signal, a version query and a firmware upgrade.

S130: A motor control signal for controlling operation of a motor is generated according to the accelerator control data.

Preferably, the motor control signal is configured to control a rotation speed of the motor. S140: The motor control signal is transmitted to the motor.

The UAV is used as an example. During the operation of the UAV, the accelerator controller is integrated in a flight control module, and a process of controlling an accelerator is described below. An operation signal of a user is sent to the flight control module of the UAV through a remote control, and then the flight control module calculates the accelerator signal in combination with an attitude of the UAV according to the operation signal, and sends the accelerator signal to the ESC. The accelerator signal sent by the accelerator controller is a digital signal, which is subjected to small interference during transmission, unlike an analog signal that is susceptible to interference such as impedance and capacitive reactance. Accordingly, data inaccuracy is not caused. In addition, in the manner of serial communication, a higher baud rate may be adopted to shorten an accelerator control cycle, thereby achieving high-speed control of an accelerator and increasing the control frequency. The ESC extracts the accelerator control data of the digital signal from the accelerator signal, and extracts the accelerator control data from the accelerator signal of the digital signal. This manner is simple and convenient, and the data is accurate. Unlike the pulse width control manner, an input capture function of a timer is required to be used to measure the pulse width, and then the accelerator value is obtained through conversion, thereby avoiding inaccurate control as a result of a measurement error of the pulse width. Finally, the motor control signal for controlling operation of the motor is generated according to the accelerator control data, and the motor control signal is transmitted to the motor, so that the accelerator control data may be transmitted to the motor without deviation.

In different implementations, the accelerator controller may be a control module, such as an accelerator generator, a flight control module and a motion control module, that controls the accelerator signal. The accelerator generator, the flight control module and the motion control module may be a microprogrammed control unit (MCU) or a digital signal processor (DSP). The transmission from the accelerator controller to the ESC is a serial information frame including the accelerator signal, then information about each frame is analyzed according to a communication protocol corresponding to the communication interface, and the corresponding accelerator control data is extracted. Generally, the accelerator control data of the ESC is expressed by 16 bits with a value range of 0 to 65535.

Figure 2:
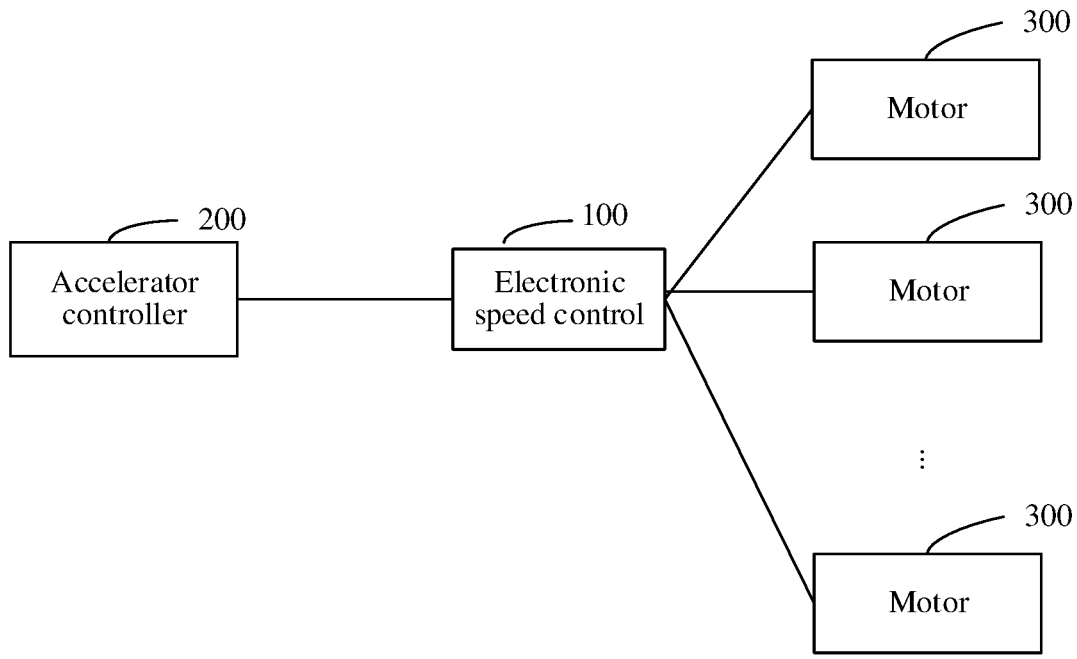
FIG. 2 is a block diagram of an accelerator control device of an electronic speed control according to an embodiment of the present application.

In an embodiment, as shown in FIG. 2, a plurality of motors 300 may be controlled through one electronic speed control (ESC) 100. After a plurality of motor control signals for controlling the operation of the plurality of motors 300 is generated, the plurality of motor control signals is respectively transmitted to the corresponding motors 300. In an embodiment, one or more of a CAN interface, an SPI interface, a UART interface, an I2C interface, an RS232 interface and a USB interface may be adopted as the serial communication interface. The serial communication protocol is set depending on different serial communication interfaces, or may be freely agreed.

In an implementation, the accelerator signal includes check data. The ESC checks the accelerator signal according to the check data in the accelerator signal after receiving the accelerator signal, and the accelerator control data is extracted from the accelerator signal if the checking succeeds. If the checking fails, the ESC discards the accelerator signal and does not perform any processing on the accelerator signal. Optionally, the ESC does not send any control information to the motor. In order to prevent the serial communication interface from receiving an incomplete accelerator signal, a highly reliable data check method such as cyclic redundancy error check (CRC) and longitudinal redundancy check (LRC) may be adopted. The ESC checks the accelerator signal according to the check data, and the accelerator control data is extracted from the accelerator signal if the checking succeeds. If the checking fails, the ESC does not perform subsequent operations, or may return control error information. The accelerator control data may include check data of one byte, or may include check data of two or more bytes. In the foregoing embodiment, in order to achieve a higher control frequency, a serial communication time may be reduced. The serial communication time depends on the number of sent bytes and a communication baud rate. According to actual application requirements, a proper baud rate of the serial communication interface is used, the baud rate of serial communication interface being greater than or equal to 115200 bps. In some implementations, a baud rate of the serial communication interface may be selected from 115200 bps to 1500000 bps.

A simplex working mode may be adopted for serial communication, to simplify a control line and reduce the demand for resources such as an IO port and a serial communication device, which is adapted to control the ESC in a broadcast manner. A duplex working mode may also be adopted for serial communication. This facilitates controlling of the ESC, for example, feedback of control signal error information, an ESC upgrade and so on.

Figure 3:
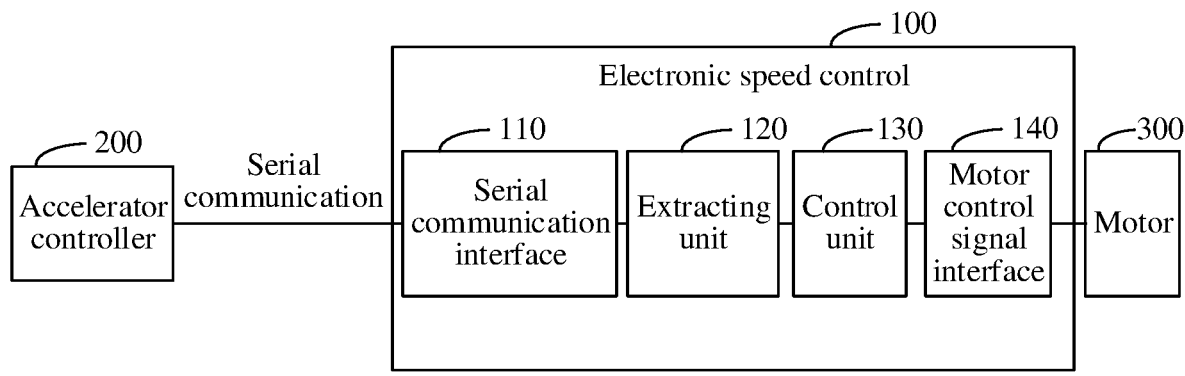
FIG. 3 is a block diagram of an accelerator control device of an electronic speed control according to another embodiment of the present application.

FIG. 3 is a block diagram of an accelerator control device according to another embodiment of the present application. The device includes an electronic speed control (ESC) 100. The ESC 100 includes a serial communication interface 110, an extracting unit 120, a control unit 130 and a motor control signal interface 140. The serial communication interface 110 is configured to receive an accelerator signal sent by an accelerator controller 200. The extracting unit 120 is configured to extract accelerator control data from the accelerator signal. The control unit 130 is configured to generate, according to the accelerator control data, a motor control signal for controlling operation of a motor. The motor control signal interface 140 is configured to transmit the motor control signal to a motor 300.

One or more of a CAN interface, an SPI interface, a UART interface, an I2C interface, an RS232 interface or a USB interface may be adopted as the serial communication interface 110. The serial communication protocol is set depending on different serial communication interfaces 110, or may be freely agreed. The extracting unit 120 and the control unit 130 may be processors. The processor may be a chip. A memory stores a communication protocol and related control instructions. The processor extracts the accelerator control data from the accelerator signal according to the communication protocol, and then generates, according to the accelerator control data, a motor control signal for controlling operation of the motor to control the operation of the motor.

In this embodiment, the accelerator controller 200 generates an accelerator signal including accelerator control data, and then sends the accelerator signal to the ESC 100. The ESC 100 extracts the accelerator control data and controls operation of the motor 300 after receiving the accelerator signal. The ESC 100 may return confirmation information to the accelerator controller after receiving the accelerator signal, or may not return confirmation information. The confirmation information is used to indicate that the ESC has received the accelerator signal. When the ESC does not return the confirmation information, the control method is simple and convenient with a high speed for controlling. The accelerator signal may include accelerator control data of all the ESCs 100, or the ESCs 100 may be divided into several parts, and then the ESCs 100 corresponding to different parts send the accelerator signals. Alternatively, each of the ESCs 100 corresponding to the accelerator signals sends one accelerator signal. This manner, in which accelerator control data of a plurality of ESCs included in a frame of data packets is sent once and received by a plurality of ESCs at the same time, and each ESC obtains its own accelerator control data according to its own serial number or identifier, is referred to as a "broadcast manner". The broadcast manner is adopted, which not only achieves signal synchronization of the ESCs 100, but also simplifies the control line and reduces the demand for resources such as IO ports and serial communication devices.

Figure 4:
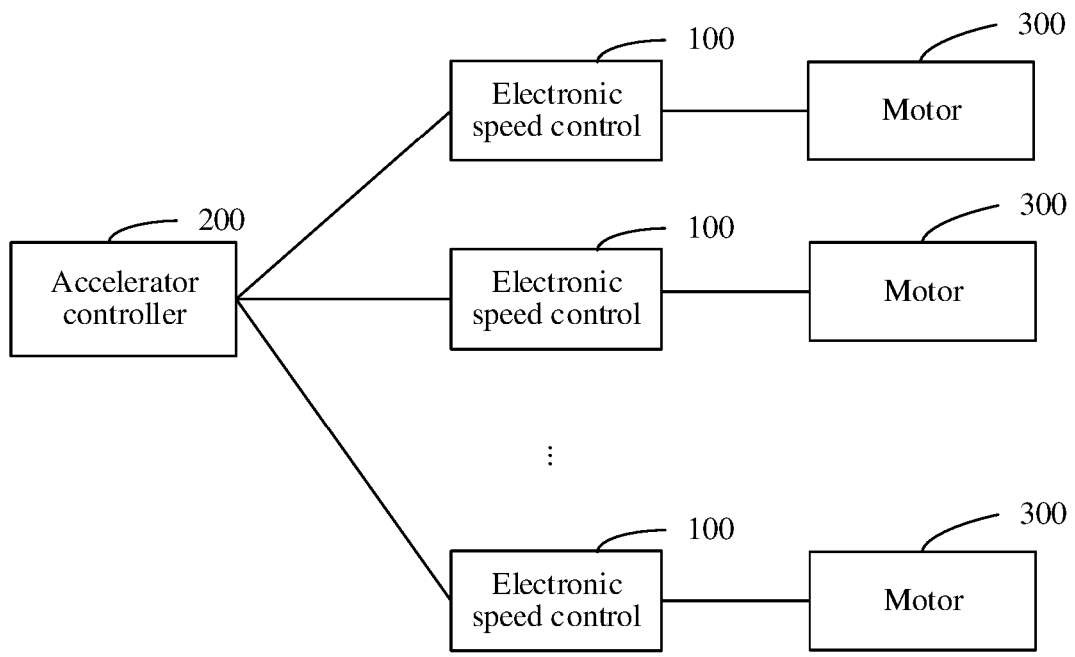
FIG. 4 is a block diagram of an accelerator control device of an electronic speed control according to still another embodiment of the present application.

In some embodiments, as shown in FIG. 4, there may be a plurality of ESCs. In this embodiment, the accelerator controller 200 is respectively connected to a plurality of ESCs 100, and the plurality of ESCs 100 is correspondingly connected to a plurality of motors 300, respectively. Since a main difference between the accelerator control device in the two embodiments and that in the foregoing embodiment is that there is a plurality of ESCs 100 and/or a plurality of motors in this embodiment, the similarity between the two embodiments and the foregoing embodiment is not described in detail. The difference is mainly described below.

In this embodiment, there may be a plurality of ESCs 100, and the serial communication interface is specifically configured to receive an accelerator signal sent by an accelerator controller in a broadcast manner. Specifically, the accelerator controller 200 may generate an accelerator signal including accelerator control data for use by the plurality of ESCs, and then sends the accelerator signal to the corresponding plurality of ESCs 100. The ESC 100 extracts the accelerator control data and controls operation of the motor 300 after receiving the accelerator signal, which does not need to return information, so that the control manner is simple and convenient with a high speed of controlling. The accelerator signal may include accelerator control data of all the ESCs 100, or the ESCs 100 may be divided into several parts, and then the ESCs 100 corresponding to different parts send the accelerator signals. Alternatively, each of the ESCs 100 corresponding to the accelerator signals sends one accelerator signal. The broadcast manner is adopted, which not only achieves signal synchronization of the ESCs 100, but also simplifies the control line and reduces the demand for resources such as IO ports and serial communication devices.

In an implementation, the accelerator signal includes accelerator control data corresponding to a plurality of ESCs, the plurality of ESCs extracting accelerator control data of the corresponding ESC from the accelerator signal according to the corresponding identification identifier. Specifically, the accelerator signals corresponding to the plurality of ESCs are provided with accelerator control data corresponding to the plurality of ESCs. The accelerator control data of the plurality of ESCs may be the same data or different data. For example, in a quadrotor UAV, the UAV has four rotors, each rotor being mounted to a motor, and each motor being controlled through one ESC. The accelerator signal includes accelerator control data. Data of two bytes is set for the accelerator control data corresponding to one ESC. The data of two bytes may generate 256*256 control modes, which may control the ESC very accurately. Four ESCs are provided with different identification identifiers such as A, B, C and D. The accelerator signals corresponding to the four ESCs may include accelerator control data of eight bytes. The data of two bytes corresponding to the ESC is extracted from the accelerator control data according to the identification identifier. For example, A corresponds to data of first two bytes, and D corresponds to data of last two bytes. Alternatively, data of two bytes in the accelerator control data corresponds to two or more ESCs. Definitely, data of one or three bytes may alternatively be set for the accelerator control data corresponding to one ESC.

The embodiments of the present application further provide a power system and an unmanned aerial vehicle (UAV). The power system includes a motor and the accelerator control device as described above, the accelerator control device being electrically connected to the motor and being configured to control the motor. The UAV includes a fuselage and the power system as described above, the power system being mounted onto the fuselage and being configured to provide flight power for the UAV.

The present application further provides an unmanned aerial vehicle (UAV) that performs all or a part of the steps of the accelerator control method shown in FIG. 1. The UAV includes:

at least one processor; and
a memory communicatively connected to the at least one processor; where
the memory stores an instruction that may be executed by the at least one processor, the instruction being executed by the at least one processor, so that the at least one processor may perform the accelerator control method described in any of the foregoing exemplary embodiments.

In an exemplary embodiment, a storage medium is further provided. The storage medium is a computer readable storage medium, and may be, for example, a temporary and non-transitory computer readable storage medium including instructions. The storage medium is, for example, a memory including instructions, and the foregoing instructions may be executed by a processor. The processor is connected to an accelerator controller through a serial communication interface, and a program stored in the storage medium, when executed by the processor, performs the following method:

receiving an accelerator signal from the accelerator controller through the serial communication interface;
extracting accelerator control data from the accelerator signal;
generating, according to the accelerator control data, a motor control signal for controlling operation of a motor; and
transmitting the motor control signal to the motor to control a speed at which the motor rotates.

Optionally, the serial communication interface is any one or more of a CAN interface, an SPI interface, a UART interface, an I2C interface, an RS232 interface and a USB interface.

Optionally, the accelerator signal includes check data. The received accelerator signal is checked according to the check data, and the accelerator control data is extracted from the accelerator signal if the checking succeeds.

Optionally, a baud rate of the serial communication interface is greater than or equal to 115200 bps.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments only show several implementations of this application and are described in detail, but they should not be construed as a limitation on the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. An accelerator control method, comprising:
   receiving, by an electronic speed control (ESC), an accelerator signal through a serial communication interface, wherein the accelerator signal comprises check data;
   checking, by the ESC, the accelerator signal according to the check data, and extracting an accelerator control data from the accelerator signal as the checking is performed successfully;
   generating, according to the accelerator control data, a motor control signal for controlling operation of a motor; and
   transmitting the motor control signal to the motor.

2. The accelerator control method according to claim 1, wherein the serial communication interface is any of the following interfaces:
   a CAN interface, an SPI interface, a UART interface, an I2C interface, an RS232 interface and a USB interface.

3. The accelerator control method according to claim 1, wherein there is a plurality of ESCs, and the receiving, by an electronic speed control (ESC), an accelerator signal through a serial communication interface specifically comprises:
   receiving, by each of the plurality of ESCs through the serial conte ication interface, the accelerator signal sent by an accelerator controller in a broadcast manner.

4. The accelerator control method according to claim 3, wherein the accelerator signal comprises accelerator control data corresponding to the plurality of ESCs, and the extracting accelerator control data from the accelerator signal comprises:
   extracting, by the each of the plurality of ESCs according to an identifier of the each of the ESCs, accelerator control data corresponding to the each of the ESCs from the accelerator signal.

5. The accelerator control method according to claim 1, wherein a baud rate of the serial communication interface is greater than or equal to 115200 bps.

6. An unmanned aerial vehicle, comprising:
a motor; and
an electronic speed control (ESC) configured to:
receive an accelerator signal through a serial communication interface, wherein the accelerator signal comprises check data;
check the accelerator signal according to the check data, and extract the accelerator control data from an accelerator signal as the checking is performed successfully;
generate, according to the accelerator control data, a motor control signal for controlling operation of a motor; and
transmit the motor control signal to the motor.

7. The unmanned aerial vehicle according to claim 6, wherein the serial communication interface is any of the following interfaces:
a CAN interface, an SPI interface, a UART interface, an I2C interface, an RS232 interface and a USB interface.

8. The unmanned aerial vehicle according to claim 6, wherein the unmanned aerial vehicle comprises a plurality of ESCs;
wherein each of the plurality of ESCs is configured to receive, through the serial communication interface, the accelerator signal sent by an accelerator controller in a broadcast manner.

9. The unmanned aerial vehicle according to claim 8, wherein the accelerator signal comprises accelerator control data corresponding to the plurality of ESCs;
wherein the each of the plurality of ESCs is configured to extract according to an identifier of the each of the ESCs, accelerator control data corresponding to the each of the ESCs from the accelerator signal.

10. The unmanned aerial vehicle according to claim 6, wherein a baud rate of the serial communication interface is greater than or equal to 115200 bps.

11. An unmanned aerial vehicle, comprising:
a center housing;
an arm connected to the center housing;
an accelerator controller located in a cavity formed by the arm or the center housing;
an electronic speed control (ESC) connected to the accelerator controller through a serial communication interface;
a motor connected to the arm; and
a propeller connected to the motor and configured to generate, under the driving of the motor, a force that causes the unmanned aerial vehicle to move, wherein the ESC is configured to:
receive an accelerator signal from the accelerator controller through the serial communication interface, wherein the accelerator signal comprises check data;
checking the accelerator signal according to the check data, and an accelerator control data being extracted from the accelerator signal as the checking is performed successfully;
generate, according to the accelerator control data, a motor control signal for controlling the operation of the motor; and
transmit the motor control signal to the motor to control a speed at which the motor rotates.

12. The unmanned aerial vehicle according to claim 11, wherein the serial communication interface is any of the following interfaces:
a CAN interface, an SPI interface, a UART interface, an I2C interface, an RS232 interface and a USB interface.

13. The unmanned aerial vehicle according to claim 11, wherein the unmanned aerial vehicle comprises a plurality of ESCs, each of the plurality of ESCs receiving, through the serial communication interface, the accelerator signal sent by the accelerator controller in a broadcast manner.

14. The unmanned aerial vehicle according to claim 13, wherein the accelerator signal comprises accelerator control data corresponding to the plurality of ESCs, the each of the ESCs extracting accelerator control data corresponding to the each of the ESCs from the accelerator signal according to an identifier of the each of the ESCs.

15. The unmanned aerial vehicle according to claim 11, wherein a baud rate of the serial communication interface is greater than or equal to 115200 bps.

16. The unmanned aerial vehicle according to claim 11, wherein the accelerator controller is a flight control module.

* * * * *